Patented Feb. 9, 1932

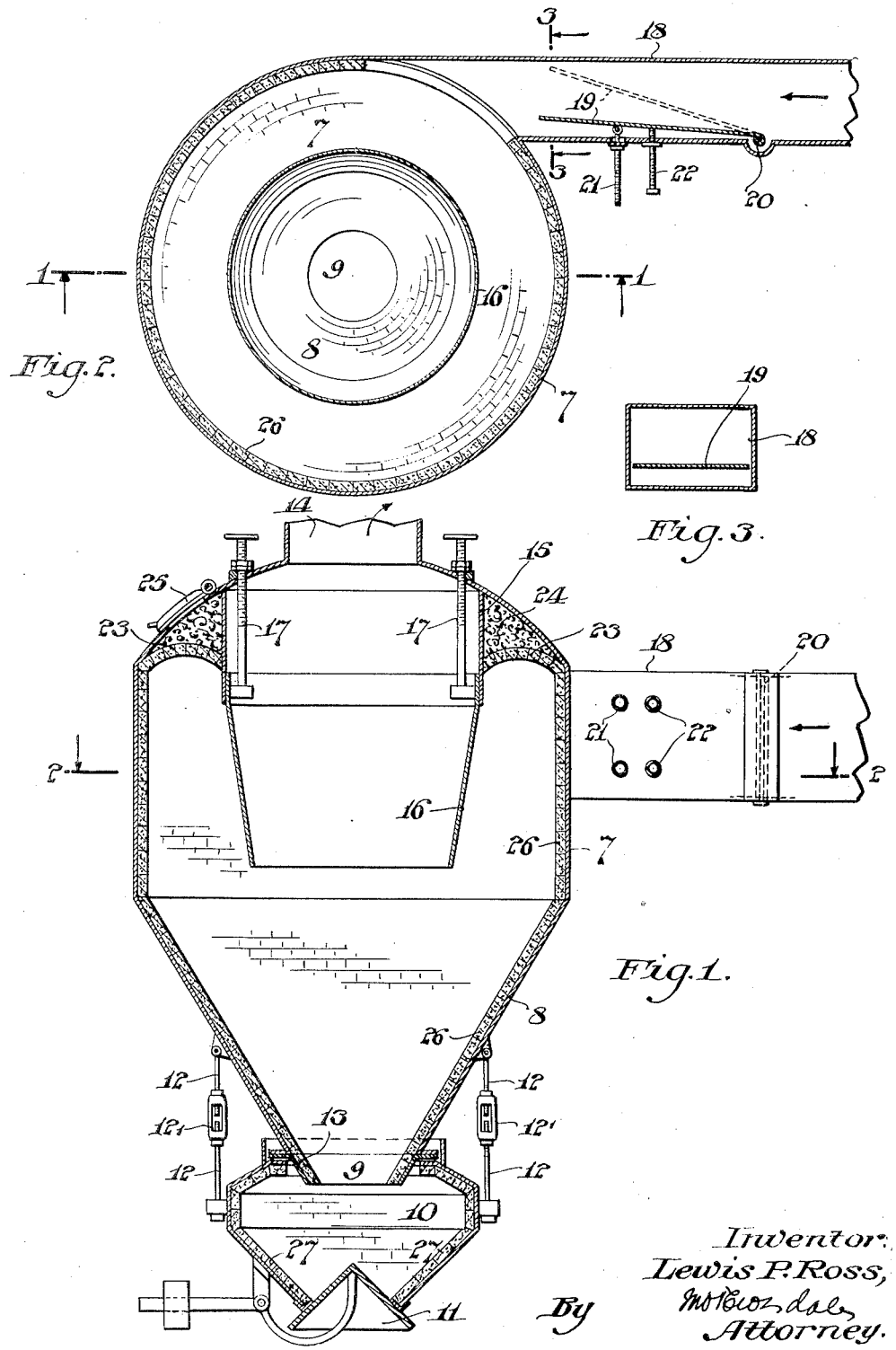

1,844,369

UNITED STATES PATENT OFFICE

LEWIS P. ROSS, OF NEW YORK, N. Y.

DUST SEPARATOR

Application filed February 12, 1929. Serial No. 339,286.

The invention relates to dust separators. The object is to provide improved means for separating the dust from fluid mediums, especially the hot gases from blast furnaces. My improvements are especially adapted for handling the gases, at high as well as low temperatures, for example, temperatures as high as 1200° F.

The invention comprises improved means for controlling the delivery of gas to the separator without impairing the centrifugal action, the formation and adjustment of the baffles, the adjustment of the discharge with respect to the settling chamber or dust collector, and the means for protecting the exposed surfaces from damage due to the wearing action of the sharper and coarser dust particles, and to conserve the heat. The invention comprises details in arrangement and construction.

Referring to the drawings, which illustrate, merely by way of example, suitable means for effecting my invention;—

Fig. 1 is a central vertical section.

Fig. 2 is a horizontal section on the line 2, 2 of Fig. 1.

Fig. 3 is a cross-section on line 3, 3 of Fig. 2.

Similar numerals refer to similar parts throughout the several views.

The chambered formation 7 is provided with a tapered lower extension 8 having an opening 9 at the bottom thereof, discharging to the dust collector 10. This collector chamber 10 has a delivery opening at the bottom, controlled by the balanced valve 11. The dust collector 10 has adjustable relationship with the lower end 13 of chambered formation 7, by means of the bolts 12 and turnbuckles 12', or by other suitable means, so that the amount of projection of the end 13 of chambered formation 7, into chamber 10 may be adjusted as required.

At the upper part of the chambered formation 7 is provided the discharge passage or port 14 for the gases, after the dust has been separated therefrom. Surrounding the discharge port 14 is the stationary cylindrical formation 15, depending from the upper wall of said chambered formation 7.

A tapered formation or baffle 16 is adjustably supported from the upper walls of the formation 7 by the bolts 17, or other suitable means. This formation 16 has telescoping relation with the cylindrical formation 15.

It will be noted that the means for adjusting the formation 16, the dust collector 10 and the baffle or valve 19 in conduit 18, all have operating parts outside the apparatus so that the same may be manipulated at all times, even during the operation of the separator, so that proper coordination may be maintained from time to time as required.

The conduit 18 delivers gas from the blast furnace tangentially to the upper part of chambered formation 7 between the inner walls of said chambered formation and the outer walls of cylinder 15 and baffle 16. This conduit 18 is controlled by the valve 19 pivotally mounted at 20, and which is adjustable, as for example, by means of the swiveled bolts 21 and set-screws 22.

A fire brick wall or arch 23 is provided in the upper part of chamber 7 around the cylindrical formation 15, and just above the gas intake from conduit 18, and the space above this arch 23 is preferably filled with granulated slag, or other suitable material, as at 24, which serves as a heat insulator. The arch 23 contributes in conducting the gas currents delivered from conduit 18 in a circular and downwardly direction. A suitable number of manholes 25 are provided for introducing the granulated slag.

It will be noted that the valve or baffle 19, in its throttling positions, tends to increase the tangential effect of the delivery of the gases to the chambered formation 7, and that the adjusting means are preferably protected from the current of gas passing through the conduit. It will also be noted that the valve 19 is positioned entirely within the conduit and does not extend into the chamber 7.

As the gas delivered to chamber 7 from the blast furnace may be very hot and laden with dust containing grit which would tend to abrade or wear the walls of the chamber 7, it is preferable to line the chamber 7 with a hard fire brick or a vitrified brick, as at 26, and it is also preferable to line the dust collecting chamber 10 with fire brick as at 27.

*In operation*

The gas is delivered to the chambered formation 7 through the conduit 18 from the blast furnace. This gas may be delivered under the natural pressure from the furnace, and being delivered tangentially, said pressure and the inertia of the gas and dust will develop a centrifugal whirling action to throw out the coarser material against the brick lined or more or less rough surfaces of the chambers 7 and 10. This whirling action of the gas is primarily in a circular path of travel around the formation 16, gradually developing into a downwardly directed helical path of travel until it passes the lower margin of formation 16, whereupon it travels to rise in an upwardly directed helical path of travel through formations 16 and 15 to the exit 14.

It will of course be understood that, under certain conditions, the pressure of the gas may be augmented by other means, but ordinarily the natural pressure of the gas delivered straight from the furnace will be sufficient to cause the operation as above described.

As the dust is separated from the gas and settles in the collector 10, the gas ascends through the formations 16 and 15 to the outlet 14.

As above stated the formations 15 and 16 are relatively adjustable and also the relations between discharge end 13 and element 10 are relatively adjustable. This element 13 may also be interchangeable with other elements 13 having different sized openings 9, either larger or smaller, as may be required. In this way the several baffling elements may be adjusted and coordinated with respect to velocity and content of the gas.

The lining of the chambers with fire brick or the like is important in accordance with my invention, since such a device should be arranged to last over a long period, as it is very expensive to shut down a blast furnace plant to make repairs. The comparatively rough surface of the brick lining also facilitates the separation of the dust from the gas.

It is also important that the throttle-valve or baffle, controlling the discharge from the conduit, should be arranged entirely within the conduit, since any such device and its adjusting means projecting into the separator chamber, would be subject to the sharp action of the flue dust and gases and would soon be rendered inoperative.

The element 16 is preferably positioned within the element 15, since the element 15, being subjected to the greater heat, its expansion would be greater than that of element 16, and thus the adjustable movement between the two elements would not be adversely affected.

What I claim is:—

1. The method of separating solid matter from blast furnace gas varying in pressure and content, which consists in delivering the gas directly from the furnace, tangentially to an annular space, to cause it to move in said space primarily in a substantially circular path of travel gradually developing into a downwardly directed helical path of travel, then causing movement of the gas through a centrally disposed upwardly directed helical path of travel, throttling the gas entering the annular space and baffling said whirling gas therein at separated and opposed regions in degrees coordinated with respect to said varying pressure and content.

2. A dust separator comprising a chambered formation having a downwardly tapering extension with a discharge at the bottom, a stationary cylindrical body positioned centrally within the upper part of said chambered formation and spaced from the surrounding wall thereof, a gas conduit delivering tangentially into the space formed by the surrounding wall of the chambered formation and the wall of the cylindrical body, a dust receiving chamber adjustably positioned with respect to said discharge and means located outside the separator for changing the adjustment.

3. A dust separator comprising a chambered formation having a downwardly tapering extension with a discharge at the bottom, a stationary cylindrical body positioned centrally within the upper part of said chambered formation and spaced from the surrounding wall thereof, a gas conduit delivering tangentially into the space formed by the surrounding wall of the chambered formation and the wall of the cylindrical body, a tapered mouth formation associated with the discharge disengageably connected with the bottom of said chambered formation and interchangeable with mouth formations of other dimensions.

4. A dust separator comprising a chambered formation having a cylindrical part and a downwardly tapering extension with a discharge at the bottom, a cylindrical body positioned centrally within said cylindrical part and forming therewith an annular space, a gas conduit delivering tangentially into said annular space, an arched wall at the top of said annular space and removed from the top wall of the chambered formation thereby leaving a compartment between said arch and top wall, and a heat resisting substance filling said compartment.

5. In a dust separator for blast furnace gas, the combination of means forming a part cylindrical and part downwardly tapered chamber, a conduit delivering tangentially to the upper part thereof, adjustable means provided at separated and oppositely disposed regions of the chamber for baffling the flow in varying degrees coordinated with respect to the varying delivery pressures of said gas, and means located outside the chamber for the independent adjustment of said several baffling means.

6. In a dust separator for blast furnace gas, the combination of means forming a part cylindrical and part downwardly tapered chamber, a conduit delivering tangentially to the upper part thereof, a throttle valve pivoted at one end thereof within the conduit, adjustable means provided at separated and oppositely disposed regions of the chamber for baffling the flow in varying degrees coordinated with respect to the varying delivery pressures of said gas, and means located outside the chamber for the independent adjustment of said throttle and said baffling means.

LEWIS P. ROSS.